US012623738B2

(12) United States Patent
Rodrigues et al.

(10) Patent No.: US 12,623,738 B2
(45) Date of Patent: May 12, 2026

(54) ROBOT WITH MAGNETIC SHOES APPLIED TO THE METALLIC SURFACES COATING PROCESS

(71) Applicants: Petróleo Brasileiro S.A.—Petrobras, Rio de Janeiro (BR); Serviço Nacional De Aprendizagem Industrial Departmento Regional De Santa Catarina—SENAI/SC, Florianópolis (BR)

(72) Inventors: Clayton Eduardo Rodrigues, Rio de Janeiro (BR); Andre Koebsch, Rio de Janeiro (BR); Paulo Henrique Giusti, Rio de Janeiro (BR); Doglas Negri, Joinville (BR); Ismael Secco, Joinville (BR); Diego De Souza, Joinville (BR); Walter Kapp, Joinville (BR); Marco Shawn Meireles Machado, Joinville (BR); Felipe Faria, Joinville (BR); Luiz Felipe Baldo Marques, Joinville (BR)

(73) Assignees: Petróleo Brasileiro S.A.—Petrobras, Rio de Janeiro (BR); Serviço Nacional De Aprendizagem Industrial Departamento Regional De Santa Catarina—SENAI/SC, Florianópolis (BR)

( * ) Notice: Subject to any disclaimer, the term of this patent is extended or adjusted under 35 U.S.C. 154(b) by 673 days.

(21) Appl. No.: 18/152,316

(22) Filed: Jan. 10, 2023

(65) Prior Publication Data

US 2023/0219644 A1     Jul. 13, 2023

(30) Foreign Application Priority Data

Jan. 11, 2022    (BR) ..................... 10 2022 000551 6

(51) Int. Cl.
| | |
|---|---|
| *B62D 61/10* | (2006.01) |
| *B05C 5/02* | (2006.01) |
| (Continued) | |

(52) U.S. Cl.
CPC ................ *B62D 61/10* (2013.01); *B05C 5/02* (2013.01); *B25J 5/007* (2013.01); *B25J 11/0075* (2013.01);
(Continued)

(58) Field of Classification Search
CPC ......... B25J 5/007; B25J 11/0075; B05C 5/02; B60B 19/12; B60B 19/003; B05B 13/005; B05B 13/0431; B62D 57/024
See application file for complete search history.

(56) References Cited

U.S. PATENT DOCUMENTS

2005/0283043 A1* 12/2005 Sisk ....................... A61H 19/00
                                                              600/38
2019/0321868 A1* 10/2019 Emrem ................... B08B 3/024
                                 (Continued)

FOREIGN PATENT DOCUMENTS

BR       102018077380 A2     7/2020
CN          107128389 A  *  9/2017   ........... B62D 57/024
                                 (Continued)

OTHER PUBLICATIONS

Zhang, A Surface Self-adaptive Magnetic Adsorption Climbing Painting Robot, Sep. 5, 2017, EPO, CN 107128389 A, Machine Translation of Description (Year: 2017).*
(Continued)

*Primary Examiner* — Paul N Dickson
*Assistant Examiner* — Matthew D Lee
(74) *Attorney, Agent, or Firm* — Morrison & Foerster LLP

(57) ABSTRACT
The present invention aims at developing a robot for applying coating in regions called "difficult access areas" of
(Continued)

offshore platforms and ships, such as curved, vertical surfaces, or surfaces with negative inclination angles. The design concept was developed based on a low-weight painting system, integrated into a vehicle with magnetic shoes, which produces a constant magnetic force on the metallic surface, capable of guaranteeing the support of the vehicle in the different areas of application. The floating magnetic system aims at ensuring that the wheels have the necessary friction for the vehicle to move. The use of the equipment allows greater productivity, with agility and speed in the application of coatings, reduction of coating losses during the process, repeatability and guarantee of the thickness of the applied layer, in addition to allowing the application of the coating on vertical surfaces, with negative inclinations or curves.

28 Claims, 8 Drawing Sheets

(51) Int. Cl.

| | |
|---|---|
| *B25J 5/00* | (2006.01) |
| *B25J 11/00* | (2006.01) |
| *B60B 19/00* | (2006.01) |
| *B60B 19/12* | (2006.01) |
| *B60G 7/02* | (2006.01) |
| *B60K 7/00* | (2006.01) |

(52) U.S. Cl.
CPC ............ *B60B 19/003* (2013.01); *B60B 19/12* (2013.01); *B60G 7/02* (2013.01); *B60K 7/0007* (2013.01); *B60G 2300/50* (2013.01); *B60L 2210/10* (2013.01)

(56) References Cited

U.S. PATENT DOCUMENTS

| | | | | |
|---|---|---|---|---|
| 2021/0047016 A1* | 2/2021 | Rygg | .................. | B60K 7/0007 |
| 2021/0061093 A1* | 3/2021 | Li | .......................... | H02K 7/083 |

FOREIGN PATENT DOCUMENTS

| | | | | | |
|---|---|---|---|---|---|
| CN | 110371210 A | * | 10/2019 | .......... | B62D 57/024 |
| CN | 212265824 U | | 1/2021 | | |
| CN | 212290074 U | | 1/2021 | | |
| CN | 110341828 B | | 3/2021 | | |
| CN | 112739558 A | * | 4/2021 | .............. | B62D 1/04 |
| CN | 110371210 B | | 8/2021 | | |
| CN | 213855282 U | | 8/2021 | | |
| KR | 102031613 B1 | * | 10/2019 | .......... | B25J 15/0019 |
| WO | WO-2018199767 A1 | * | 11/2018 | ............. | B63B 59/08 |

OTHER PUBLICATIONS

Fang, A Magnetic Robot, Oct. 25, 2019, EPO, CN 110371210 A, Machine Translation of Description (Year: 2019).*

Zhang, A Magnetic Robot, Apr. 30, 2021, EPO, CN 112739558 A, Machine Translation of Description (Year: 2021).*

Lee, Wheel Based Mobile Robot, Oct. 14, 2019, EPO, KR 102031613 B1, Machine Translation of Description (Year: 2019).*

* cited by examiner

ROBOT WITH MAGNETIC SHOES APPLIED TO THE METALLIC SURFACES COATING PROCESS

CROSS-REFERENCE TO RELATED APPLICATION

This application claims priority to Brazilian Application No. 10 2022 000551 6, filed on Jan. 11, 2022, and entitled "ROBOT WITH MAGNETIC SHOES APPLIED TO THE METALLIC SURFACES COATING PROCESS," the disclosure of which is incorporated herein by reference in its entirety.

FIELD OF THE INVENTION

The present invention is related to the field of painting and coating curved, vertical metallic surfaces, and surfaces with negative inclination angles of offshore oil platforms, ships, or refining operating units, such as tanks and storage spheres.

DESCRIPTION OF THE STATE OF THE ART

The scanning of large surfaces for painting requires a large automated positioning infrastructure, which is usually fixed at the factory. However, in the case of ship hulls and offshore oil platforms, this type of infrastructure is so large that it becomes economically unfeasible. So, for these cases, something mobile is used on the surface to be painted. Several technologies can be used, such as the use of vehicles with wheels or magnetic tracks, systems of magnetic shoes or shoes with suction cups, installation of rails, among other technical solutions.

For a painting or coating process to be applicable to large surfaces outside the horizontal plane, it is necessary to use machines and positioning systems capable of placing the process tools at any and all points on the surface. In conventional industrial environments, scaffolding, overhead cranes, linear guides, anthropomorphic robots, etc. are used for this type of activity. However, there are some surfaces that are found in environments that do not favor the use of this more common equipment, as is the case of offshore platforms and oil extraction vessels, in which the coating of metallic surfaces is vital to prevent the deterioration of the infrastructure of the plant by oxidation and other erosive agents.

First, these manufacturing environments have very large surfaces, which often makes it impossible to use fixed-base equipment that can automate or mechanize a coating process. Another point of great influence on the complexity of applying a coating process in an offshore environment is the difficulty of peripheral access to the surface to be coated. That is, maintenance operations on the sides of ships and platforms are usually carried out from the deck or the structure itself; unlike, for example, applying a coating to a part inside a factory on dry land.

As the platforms and ships remain in operation for a long time offshore, it is not feasible to wait for docking or a total maintenance stoppage to perform the coating of the structure. As a result, currently, the application of coating in these environments is done in full operation of the plant and manually by workers, who are supported by ropes and cables to the side or area to be coated/painted. This work routine, in a way, meets the demands of maintaining the facilities, but it becomes very costly for the company, as the manual coating process is very slow and dangerous, which limits the worker productivity. And as the process is slow, the time a worker stays on the platform for this purpose is usually extended, which is a problem for offshore plants, since there is a very strict control and restriction for access and permanence of workers in that location, causing a coating process operator to occupy, for too long, a "space" in the plant that could be filled by another type of specialty.

Considering these arguments, it becomes extremely important to search for technologies that can accelerate the process of coating metallic structures in offshore environments, in which many of the areas are difficult, and sometimes impossible, to be accessed by humans, without jeopardizing the integrity of the worker. In this context, a solution was sought to automate, make flexible and improve the coating process, considering the way it is done today.

Currently, the coating processes on oil extraction platforms and similar structures is done through the use of workers specialized in industrial climbing. These professionals are suspended by ropes so that they can access the areas and surfaces on which the coating must be applied, using hand tools to perform the task.

Industrial climbers use manual spray guns, fed by paint pumps mounted on the deck of the vessel/platform, performing the paint application "by eye" and with little control over the scan speed of the paint fan and the distance from gun to surface to be coated. Further, this work model does not allow the application of coating in all necessary areas, since many of the points of the structure are inaccessible to climbers, given the curvature or inclination of the surface, which prevents the worker from descending, without considering the implications of security of a worker attempt to access such locations.

Given these particularities, the current process is inefficient and very costly, as it requires the climber to remain on the platform for a very long time, with an average production of 70 square meters per hour ($m^2$/h). Additionally, physical and climatic conditions can also be situational impediments to the operation of this professional, which makes the schedule of the coating process of a platform/vessel unpredictable and variable, thus not being advantageous for the maintenance of the plant, since it is common that the coating campaigns of the entire structure take several months.

Document BR102018077380-1 addresses to a construction of Mecanum wheels for a robot-operated painting system. The wheels have special features given the difficulties and adversities where they will be applied. They were designed to facilitate the movement of the painting system on vertical and horizontal walls and avoid loss of coating. Mecanum wheels are made up of a set of hubcaps and are used to secure the rollers. The rollers arranged at 45° and in a cylindrical-convex format contain bearings passing through their central shaft, and with projected rolls at the ends of the bearings. A magnetic base is arranged between the two wheels, being at an optimal height so that it exerts a magnetic force against the surface and so that it can overcome obstacles. The geometries and materials of the mecanum wheels were designed to be inert to the coating. Document BR102018077380-1 presents equipment capable only of applying the coating on flat and vertical surfaces. The powertrain for this work is based on a rope system that is not directly connected to the wheels, which are only passive and respond to external forces from the equipment structure. Furthermore, the document presents a coating applicator with only one degree of freedom (oscillatory).

Document CN212265824U discloses a multifunctional garment management robot, including omnidirectional movement mechanism, multifunctional load fuselage, arm base, big arm, elbow, forearm and manipulator. Although it is a robot applied to a different field regarding the present invention, it is capable of manipulating objects with its robotic arms. The robot was developed only for flat surfaces, since it has a rigid suspension, not being able to adapt to surfaces. With respect to robotic arms, they are used in the direct manipulation of objects and apparently were developed for a specific and limited application.

Document CN213855282U discloses an automatic paint spraying mechanical arm comprising a base, a support rod, a spray head, and a guide tube. The automatic paint spraying mechanical arm has a nozzle and a set of slides that adjust the angle to meet the needs of paint spraying, and can cover different angles. The work focuses on the development of a generic movement system on a planar surface for spray paint application. The proposal of document CN213855282U clearly focuses (from the point of view of a technician) on the improvement of manual painting processes on the factory floor of the conventional industry, where the robot moves on flat surfaces and in a terrestrial environment. This type of environment does not require such strict care with stability, vehicle dynamics and weight-to-friction ratio, as well as care with obstacles.

Document CN110341828B discloses a device for moving on a curved surface and a magnetic cleaning robot. The robot includes a trolley body. The driving device is arranged in the trolley body and is used to drive the wheels. The curved surface walking device disclosed in the work allows the structure to rotate along the axis direction of a joint piece to adapt to work surfaces with different radii of curvature and ensures that the magnetic cleaning robot can be effectively attached to the work surfaces for stable cleaning. A visual analysis of the diagram of that work indicates that the equipment adapts only to convex curved surfaces, being limited to this type of surface, thus being less versatile and adaptable, also in terms of its ability to overcome obstacles placed on the surface. Further, the cleaning tool has a passive movement in relation to the surface, having joints that only react to the surface profile variation.

Document CN110371210B discloses a magnetic force robot including a body component and a plurality of oscillating structures connected to the body assembly and adapted to oscillate relative to the body assembly. Magnets are attached to the oscillating structure, so that the resultant force of the magnets is always perpendicular to an adsorption surface in the crawling process of the magnetic robot. The robot has a rigid suspension, and even though it has a rigid chassis, it still allows for a certain degree of adaptability on slightly uneven surfaces.

Document CN212290074U discloses a robot of magnetic force capable of movements in all directions of a ferromagnetic wall, driven by a mecanum-type wheel. According to the document, the robot can perform jobs such as detection on complicated interfaces, such as curved surface and circular arc. However, it should be noted that its rectangular structure further reduces its ability to adapt, being practically usable only on flat and fairly regular surfaces. The lowered structure and the magnets mounted away from the wheels can cause collisions with surface irregularities, compromising the effectiveness of the equipment.

Documents of prior art disclose robotic devices with omnidirectional wheels and/or robotic/mechanical arms. However, none of them, alone or in combination, allows remote access to regions called "difficult access areas" of offshore platforms and ships, such as curved, vertical surfaces or surfaces with negative inclination angles.

In view of the difficulties present in the abovementioned State of the Art, and for solutions for applying the coating process, there is a need of developing a technology capable of performing effectively and that is in accordance with environmental and safety guidelines. The works described do not have the unique features of this invention that will be presented in detail below.

Objective of the Invention

It is an objective of this invention to enable the painting of curved metal surfaces with different angles of inclination, including negative angles, allowing a wide surface scanning field with a lightweight modular infrastructure.

BRIEF DESCRIPTION OF THE INVENTION

The present invention aims at enabling remote access to regions called "difficult access areas" of offshore platforms and ships, such as curved, vertical surfaces, or surfaces with negative inclination angles. Aiming at meeting this objective, the concept of the design was developed based on a low-weight painting system, integrated into a vehicle with magnetic shoes, which produces a constant magnetic force on the metallic surface, capable of guaranteeing the support of the vehicle in the different areas of application. In addition to maintaining vehicle support, the floating magnetic system aims at ensuring that the wheels have the necessary friction for their displacement.

BRIEF DESCRIPTION OF THE DRAWINGS

The present invention will be described in more detail below, with reference to the attached figures which, in a schematic way and not limiting the inventive scope, represent examples of its realization. In the drawings.

DETAILED DESCRIPTION OF THE INVENTION

Figure 1:
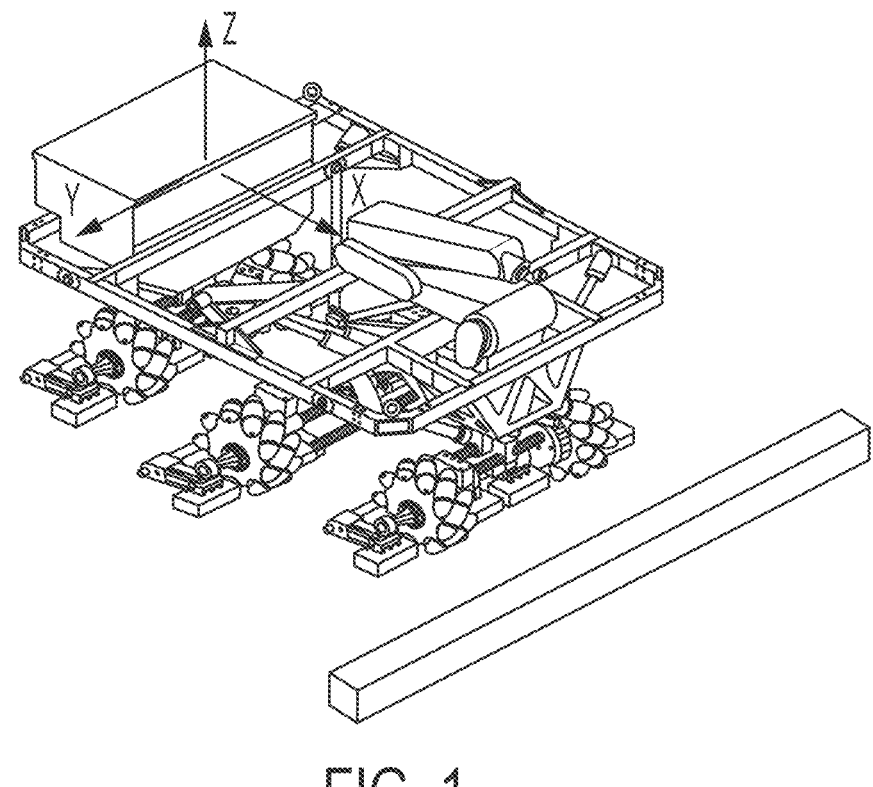
FIG. 1 illustrates the obstacle transposition in frontal approach.
Figure 2:
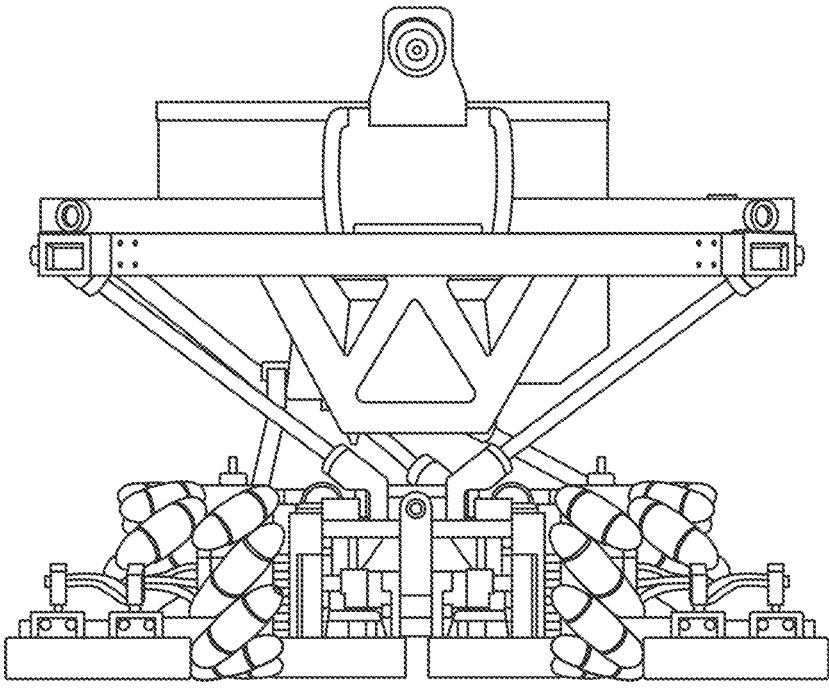
FIG. 2 illustrates the front view of the equipment.
Figure 3:
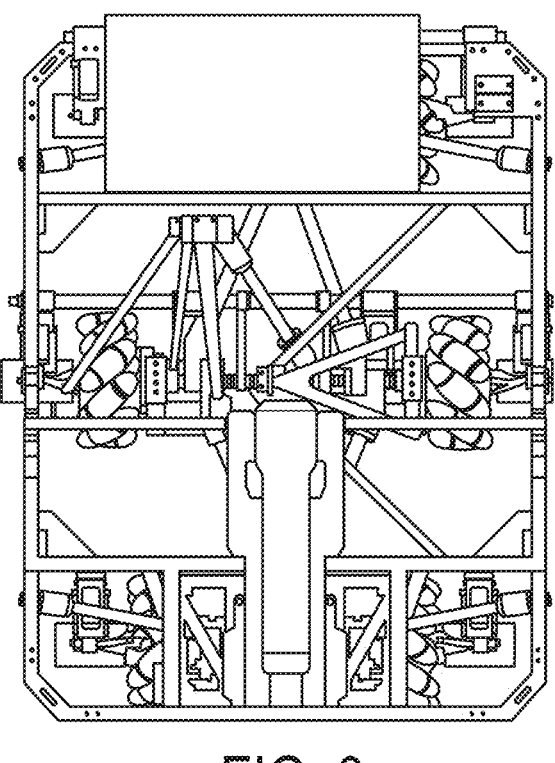
FIG. 3 illustrates the top view of the equipment.
Figure 4:
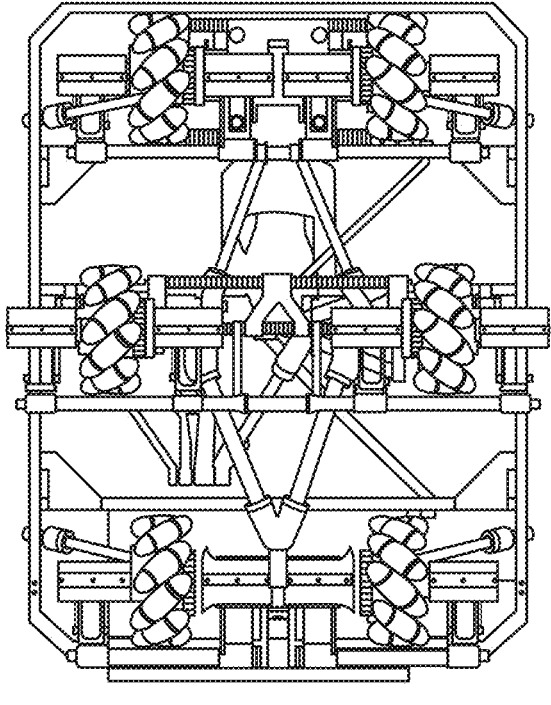
FIG. 4 illustrates the bottom view of the equipment.
Figure 5:
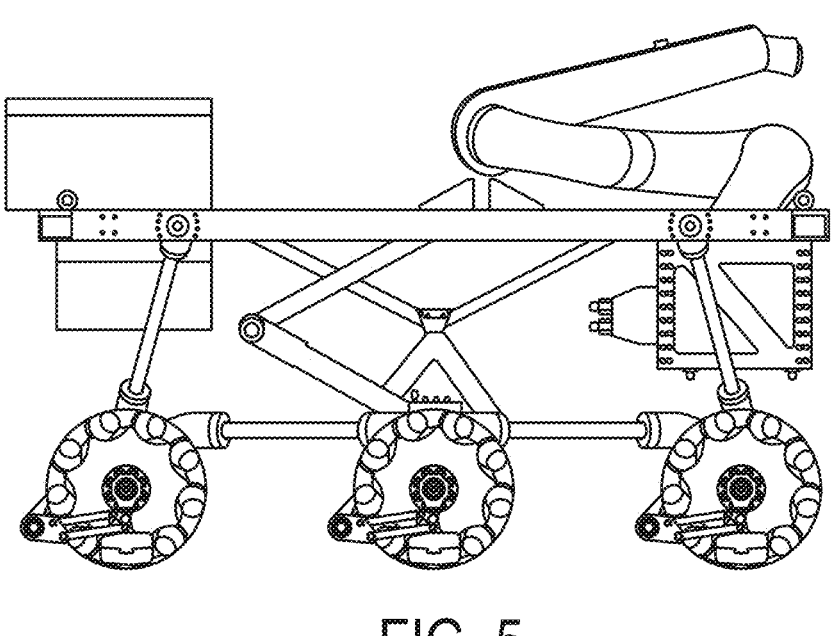
FIG. 5 illustrates the left side view of the equipment.
Figure 6:
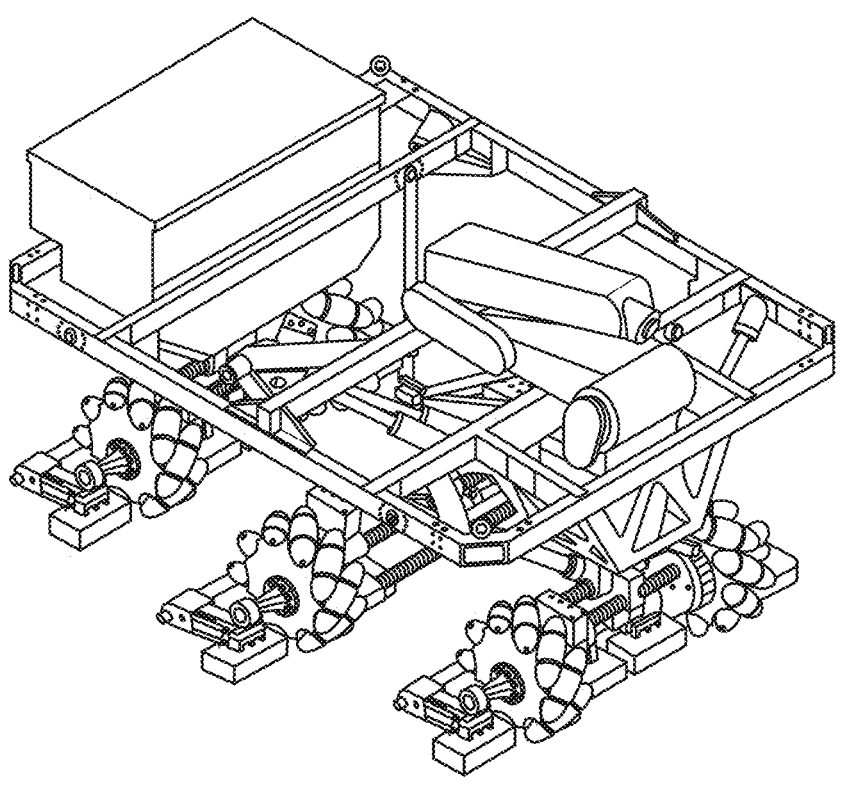
FIG. 6 illustrates the isometric view of the equipment.

There follows below a detailed description of a preferred embodiment of the present invention, by way of example and in no way limiting. Nevertheless, it will be clear to a technician skilled on the subject, from reading this description, possible additional embodiments of the present invention still comprised by the essential and optional features below.

The invention seeks to solve or reduce the limitations found in the State of the Art of the coating process in oil extraction offshore plants, through the development of a mechatronic system capable of operating, at least, by teleoperation. The main pillars of the development of the invention are:

Adherence: the equipment must be able to adhere to the ferromagnetic metallic surfaces of the target structures of the coating;

Movement: the equipment must be able to move with the maximum possible degrees of freedom on the surface to which it is adhered;

Accessibility: the equipment must, through its adherence and movement capabilities, be able to reach difficult access places that normally cannot be accessed by industrial climbers;

Dexterity: the equipment must be able to apply the coating with greater dexterity, precision and repeatability compared to manual application mode;

Productivity: the equipment must be able to perform the application of the coating with greater productivity, in square meters per hour (m²/h) in relation to the manual application mode;

Adaptability: the equipment must be capable of mechanically adapting or overcoming, in terms of positioning and movement, the geometric variations of the application surface, such as curvature radii, sheet steps, weld beads, etc.

The robot of the present invention has the ability to access difficult access areas, allowing the application of coating in places where the industrial climber is currently unable to reach, either due to physical impediment or safety standards.

The high repeatability of the industrial manipulator of this invention allows for greater uniformity of the applied coating layer, ensuring a more homogeneous and higher quality result, since it is possible to parameterize and control the movement of the manipulator, in order to optimize the process of application.

The concept of omnidirectional movement of the vehicle of this invention allows rapid repositioning and displacement on the work surface, thus increasing productivity in relation to the application of coating performed by an industrial climber.

The ability to teleoperate the vehicle ensures that the operator is not subjected to the dangerous environment to which the industrial climber is usually exposed, allowing the process to be performed on longer journeys, since the operator will work in a more ergonomic and less aggressive position.

All the above-mentioned features of the invention, when combined, not only allow for a more efficient, safe and effective coating process, but also enable the optimization of plant occupancy in an offshore environment, since the process is performed by fewer people and in a shorter period.

The robot is able to adhere and move on surfaces of ferromagnetic metal sheets of at least 8 millimeters thick at inclinations of 0 up to 180 degrees in relation to a horizontal reference. It has a suspension that allows the vehicle to adapt to curved surfaces of at least 1 meter radius (concave or convex). It is capable of overcoming rectangular obstacles of at least 22 millimeters in height in frontal approaches, in which case the obstacle line is perpendicular to the X axis of the vehicle (see FIG. 1). It is capable of operating up to, at least, 40 meters away from the central controller, where the vehicle umbilical cord is connected to the controllers and electrical panels. It is capable of applying coating layers with a thickness determined by the manufacturer of the coating material. Furthermore, it has a minimum productivity of 50 square meters per hour. Views of the robot are represented in FIGS. 2 to 6.

Considering alternative applications for the invention, it is feasible, in the face of minor modifications (without direct impact on the concept of the invention), the use of tools other than coating, both on the handle of the robot manipulator and replacing the manipulator itself. The invention ends up providing a mobile platform, allowing the implementation of process and inspection modules in its structure, enabling the transfer of technology to other applications, respecting, of course, the previously imposed restrictions.

Figure 9:
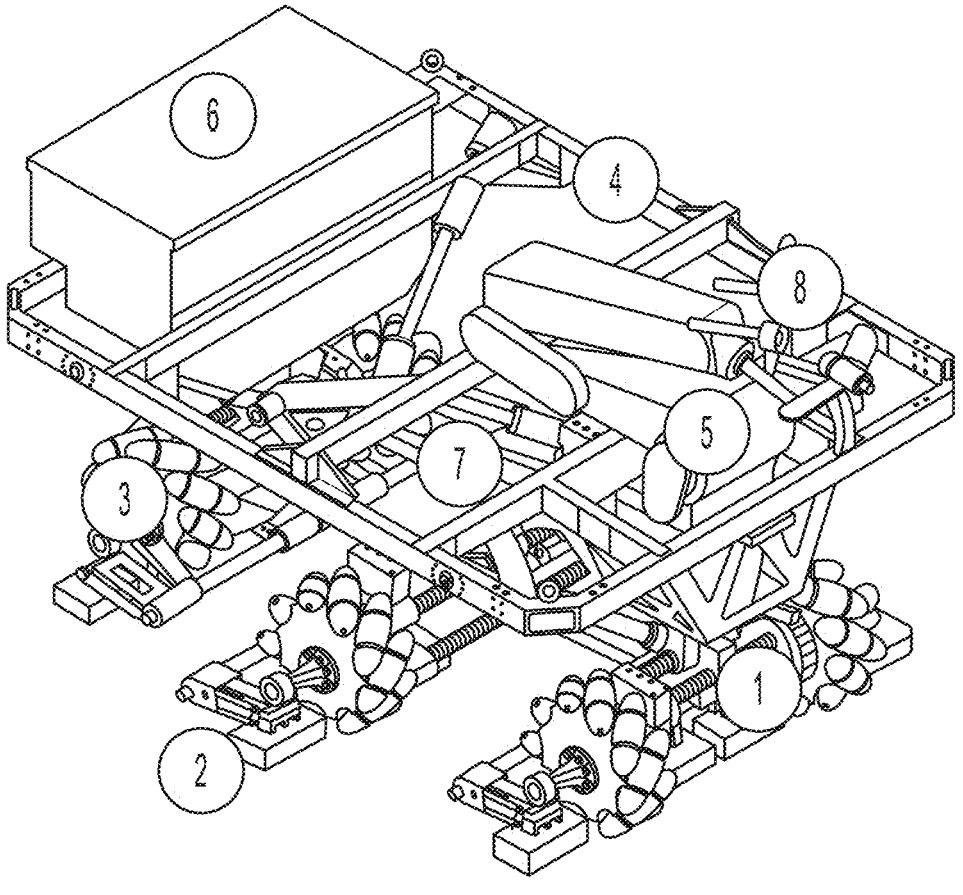
FIG. 9 illustrates the components of the invention.

According to FIG. 9, the robot consists of:

1. Powertrain: set of controlled electromechanical actuators that transfer rotating mechanical power (torque and rotation) to the wheels, allowing the vehicle to move on the surface.

2. Magnetic shoe: set consisting of permanent magnets and a magnetic path that concentrates the magnetic flux between the magnet and the surface, generating a vehicle-surface attraction force that ensures not only the vehicle adherence to the surface, but also the necessary frictional force for vehicle movement to occur on the surface.

3. Omnidirectional wheel: actuated mechanical assembly which, through the frictional force, is capable of transforming the rotating mechanical power of the powertrain into a linear movement of the vehicle. The assembly has a system of free rollers mounted at 45 degrees in relation to the wheel axle, allowing the translation movement in X and Y and rotation in Z in the normal plane of contact of the wheel with the surface.

4. Chassis: tubular and rigid mechanical structure that guarantees the mechanical interconnection between the other subassemblies of the vehicle.

5. Robotic manipulator: mechatronic system of positioning and continuous movement, programmable and reprogrammable, responsible for applying the coating on the surface.

6. Electrical panel: closed panel for power distribution and electrical control of the vehicle, in which the electrical equipment for power, energy conversion, communication, sensing, control, and thermal dissipation are mounted.

7. Suspension: mechanism that allows the vehicle structure to adapt geometrically to the surface profile.

8. Process effector: equipment that is coupled to the robotic manipulator (5) and is responsible, together with the spray gun, for executing the application of the coating.

The vehicle is equipped with three powertrains (1), which consist of motors (101) (FIG. 8), brakes, reducers and drive shafts; that is, the mechanical components responsible for generating, amplifying and transferring torque to the omnidirectional wheel hubs. Thanks to the compactness of the designed system, the assembly of most of its components occupies the internal volume of the wheel itself.

Figure 7:
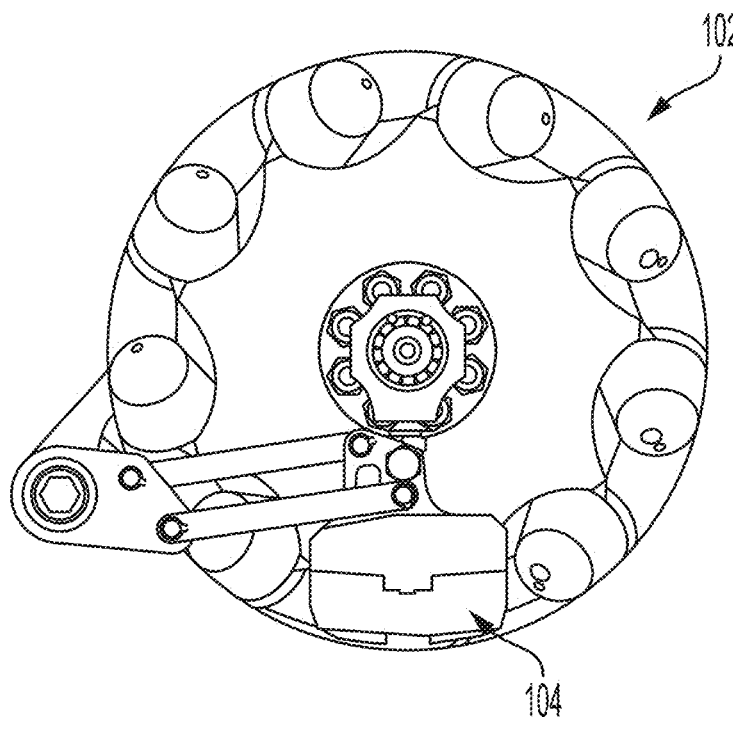
FIG. 7 illustrates the detail of the wheel plus shoe assembly.
Figure 8:
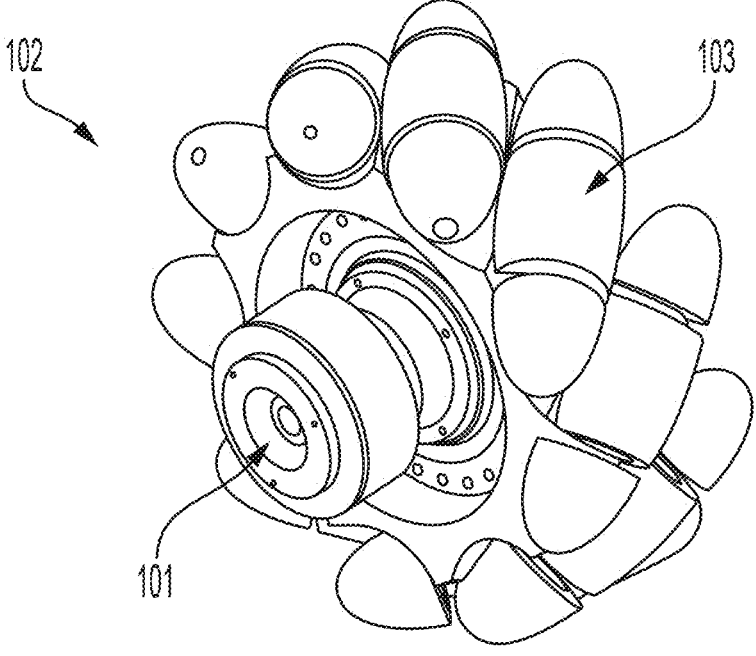
FIG. 8 illustrates the detail of the motor coupled to the wheel.

In FIGS. 7 and 8, there are represented, respectively, the detail of the wheel plus shoe assembly and the detail of the motor coupled to the wheel. The powertrains (1) have two omnidirectional wheels (102) at each end. Based on previously developed and implemented kinematics, the resulting spatial configuration of the wheels (102) allows the vehicle to be able to move in any direction, including rotating around its center of gravity. The wheels (102) are equipped with nine mecanum rollers (103) equally spaced in the radial contour, designed in a tripartite way and with a given curvature at both ends, in order to provide a greater angle of lateral approach, necessary to guarantee that the vehicle be able to overcome certain obstacles, such as weld beads and steps between sheets, when moving in the transverse direction. The rollers (103) are vulcanized with a specific rubber with a high coefficient of friction to ensure that the vehicle has the necessary mechanical adherence to move on ferromagnetic surfaces arranged in any direction (vertical, in different degrees of negative inclination, or even in inverted horizontal position).

As the mechanical adherence depends not only on the coefficient of friction of the rollers (103), but also on the magnitude of the normal force in relation to the ferromagnetic surface, each omnidirectional wheel (102) has two magnetic shoes (104), each of which shoe (104) is positioned alongside a side face of the wheel (102). The magnetic shoes (104) consist of permanent magnets enclosed by a sleeve of non-magnetic material, which in turn is attached to a ferromagnetic core that provides the optimized induction of the magnetic field between the shoe (104) and the ferromagnetic substrate, which consequently generates the normal magnetic force necessary to ensure the adhesion of the vehicle to the surface.

The suspension (7) is a set of tubular elements and machined components connected by rotating joints, designed to connect the powertrains (1) to the chassis (4) and provide the vehicle with the necessary magnetic adhesion force to overcome possible abrupt dihedral changes, or simply adapt, in a reactive way, to the irregularities of the ferromagnetic surface. The principle of the mechanism is given by the up and down movement (translation) of the central powertrain, while the adjacent powertrains have a complex movement (translation and rotation), which aims at ensuring that their respective magnetic shoes remain parallel to the magnetic surfaces of each dihedral. The chassis (4) is rigid and has no relative movement.

Connected to the suspension (7) by means of rotational joints, the chassis (4) is geometrically sprung and consists of aeronautical aluminum structural tubes and a fixation base for the robotic manipulator (5). Its primary function is to resist loads imposed during service and ensure the stiffness and dynamic stability necessary for the robotic manipulator (5) to correctly perform the coating operation, according to previously parameterized physical variables, guaranteeing the quality of the applied coating (layer thickness and surface finishing). In addition, it provides an appropriate place for fixing the power/electrical panel (6).

The electrical panel (6) is mounted on the top of the chassis (4), on the opposite side to which the manipulator (5) is mounted, in order to balance the center of gravity of the assembly. An umbilical bundle containing electrical and pneumatic power and communication connections reaches the inside of the panel via cable glands. A DC-DC static converter lowers the input supply voltage, internally distributing the DC voltages that supply other electrical devices, such as controllers, drivers, communication interfaces, relays, etc. There are, then, smaller cable glands through which the motor control cables (101) are distributed throughout the vehicle, being fixed to the chassis (4) and suspension (7) of the vehicle.

Figure 13:
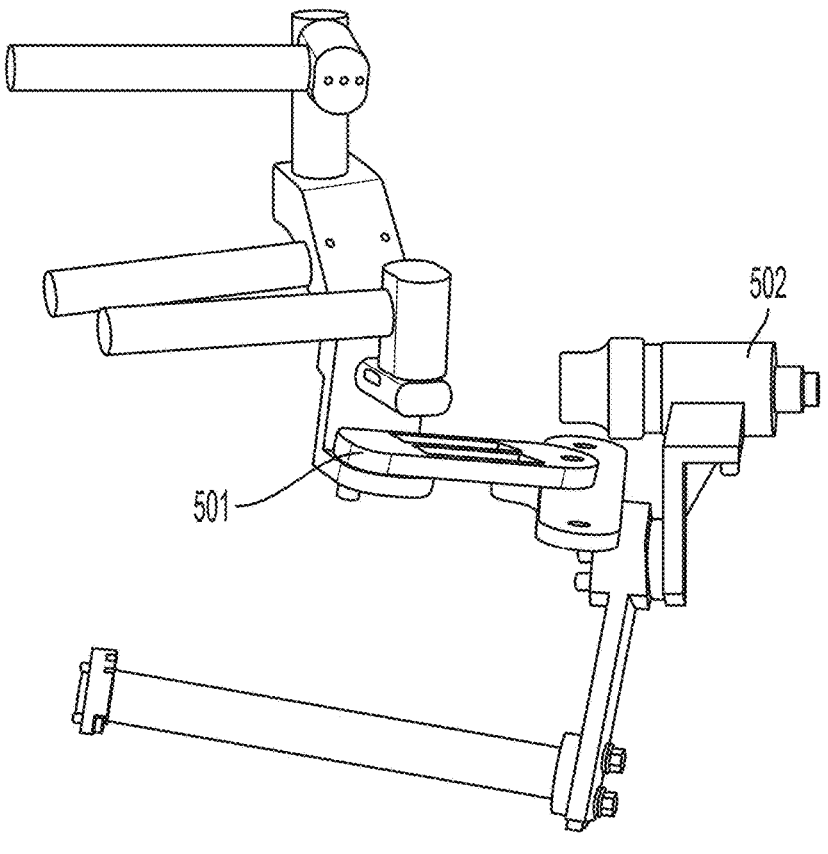
FIG. 13 illustrates the detail of the process effector plus the spray gun.

The umbilical bundle contains electrical power and communication for the vehicle panel, the power and command cables of the manipulator (5), and a supply of compressed air for actuating the coating tool (502), as shown in FIG. 13. This umbilical has its entry point in a mechanical terminal at the top of the chassis (4), close to the electrical panel (6), and at this point the various cables of the bundle are distributed by the chassis (4) and suspension (7) to their proper use terminals. In FIG. 13, the process effector (501) is also represented.

The omnidirectional displacement on any surface requires three degrees of movement, namely: two orthogonal translations and an orientation with a rotation axis normal to the surface. The mecanum wheels (102) allow this type of displacement from the control of two axles, each with a pair of wheels with opposite roller helices (left and right). That totals four wheels needed for three degrees of freedom of movement. However, this minimum condition works well provided that the traction capacity is balanced between each of the wheels, which is only possible on almost flat horizontal surfaces, or with some type of surface adaptive suspension.

In the case of the application of the robot of this invention, the surfaces will have any orientation in relation to the vector of gravity, being mostly vertical surfaces. In this specific case, as the center of mass of the robot with its pay load will never be on the surface, but away from it, the moment of the weight force with that distance to the surface unbalances the normal force of the wheels against the surface, reducing the contact force and consequently the traction of the upper wheels in relation to the vector of gravity. For that reason, the robot has three axles/shaft with a pair of mecanum wheels (102) with opposite helices on each axle. Thus, in the case where the longitudinal direction of the vehicle is aligned with the gravity vector, the central shaft maintains an average load, the lower axle has its load increased and the upper axle has its load reduced, but there will always be two axles/shaft with two pairs of wheels with full traction capacity. In the case where the transverse axis of the vehicle is aligned with the vector of gravity, all the moment of displacement of the center of gravity is applied to the central shaft (403), which has a wheel with increased traction capacity, and the pair opposite lightened, but in this condition the two end axles (404) are pivoted and do not receive the moment of the displaced center of mass and these two end axles keep the control of the vehicle. In this unique way, the mecanum wheels (102) are likely to be used for traction on vertical surfaces, with no other known application of these wheels for this type of surface.

Figure 10:
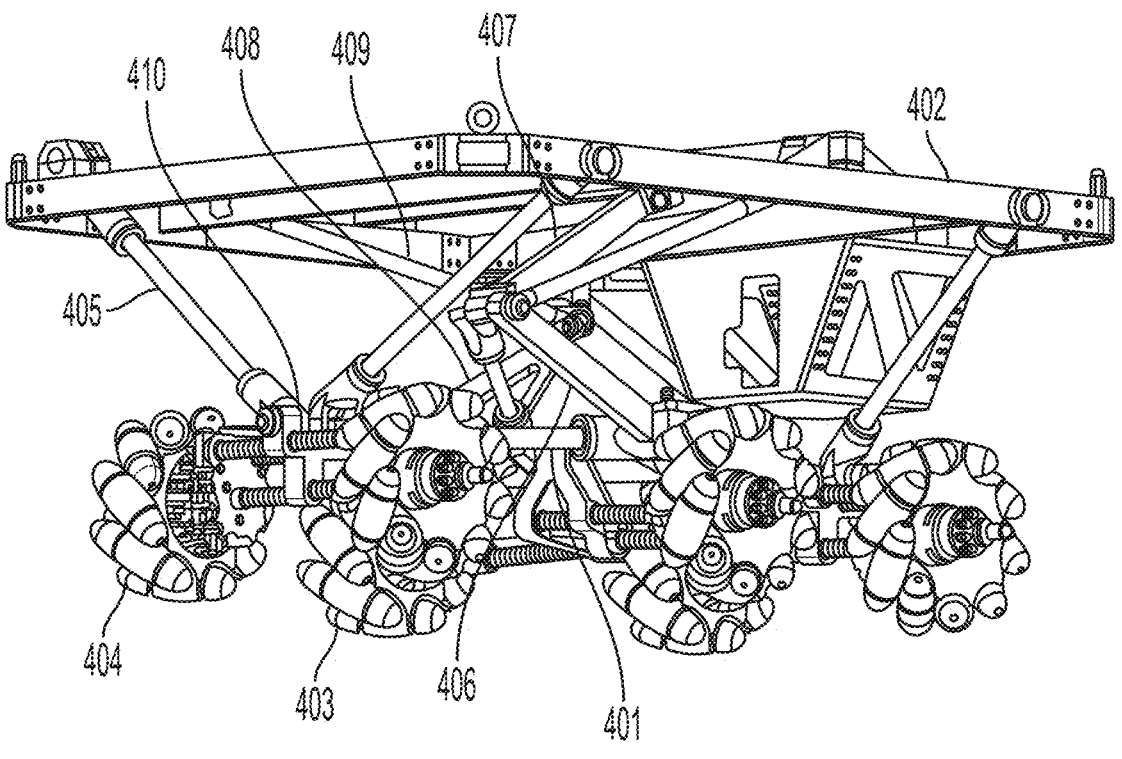
FIG. 10 illustrates the components of the suspension.

The robot of the present invention has an articulated suspension (7) for distribution of traction forces for a redundant system of six mecanum wheels (102) adaptable to any surface. The robot has six points of contact that must be rigidly adapted to any surface, so that it can carry out precise tasks. For this, the robot structure, shown in FIG. 10, is subdivided into a rigid sprung chassis (402), where the robot load and its manipulator arm are applied, and an unsprung subchassis (401) articulated that adapts to the surface. These two structures, one rigid and the other flexible, are interconnected by links that allow a rigid form for each surface form adapted in the contact of the wheels (102). There are also shown in FIG. 10: central shaft (403), end axles (404), corner links (405), lower transverse double quadrilateral (406), upper transverse stabilizer arm (407), lower longitudinal stabilizer arm (408), upper longitudinal stabilizer arm (409), pivots (410) of the triangles (414) of the subchassis (401).

To adapt to a surface that is not flat in any way, it is necessary to articulate the six points of contact, so that three virtual points of contact remain, and the way to make the reduction from six points to three is to insert three joint pivots (degrees of freedom), which in sequence are linearly independent.

Figure 11:
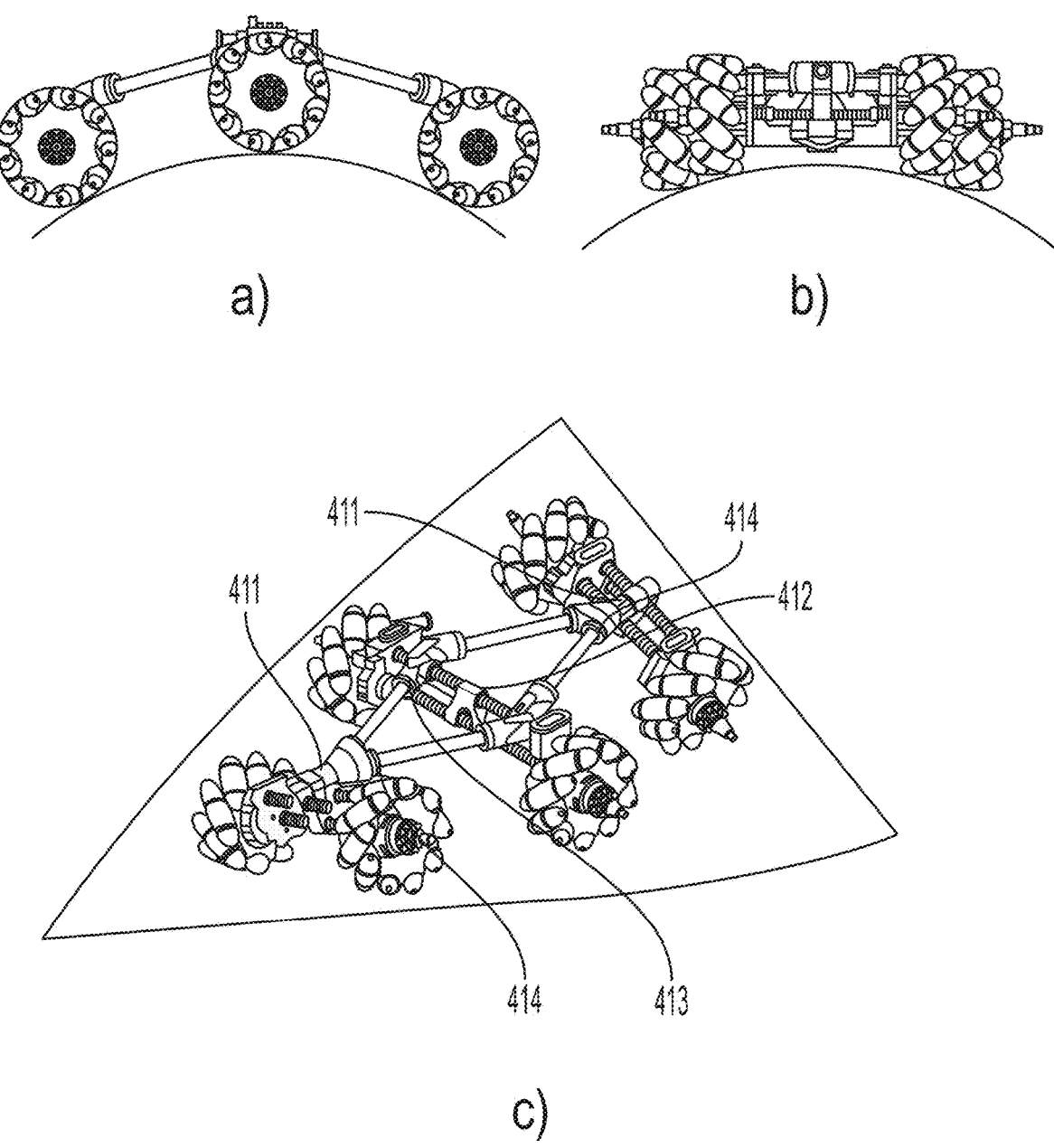
FIG. 11 illustrates the mechanism of the lower subchassis showing adaptation to different surfaces: adaptation to transverse cylindrical surface (a), adaptation to longitudinal cylindrical surface (b), and adaptation to twisted surface (c)

In this design, the three pivots were arranged as follows, as detailed in FIG. 11. The central shaft (403) is connected to two triangles (414) by their bases and at the opposite vertex of these triangles (414) there are orthogonal pivots to the central shaft (403), which are connected to the end axles (404) that are parallel to the central shaft (403). In this way, the two triangles (414) are articulated and allow adaptation on a cylindrical surface with an axis parallel to the robot axles, as shown in FIG. 11a.

As the gauge of the central shaft (403) is greater than the gauge of the end axles (404), if the cylindrical surface has six axles orthogonal to the robot axles, the central articulation (413) allows a different height of the end axles (404) in relation to the central shaft (403), shown in FIG. 11b.

The pivots (410) of the tips of the triangles (414), where the end axles (404) pivot on a longitudinal axis, allow the three axles/shaft to work in a non-parallel way, adapting a helix surface (twisted) (FIG. 11c). In FIG. 11c, the central pivot (413) of articulation of the end axles and the articulation of the subchassis in the central shaft (403) are highlighted. There are still represented in FIG. 11c: axles (411 and 412).

Compositing any overlapping cylindrical surfaces with various axis directions with a helix surface, there will be a fully generic surface shape, and this adaptation mechanism will be compatible.

Figure 12:
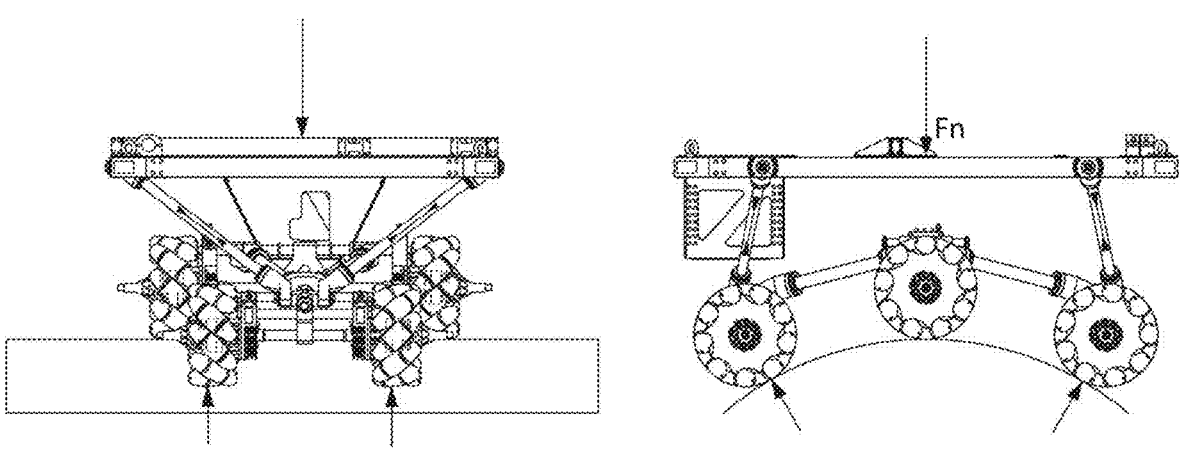
FIG. 12 illustrates the forces normal to the surface being transmitted by the corner links.

The suspension (7) is capable of distributing the vehicle forces among all the wheels. The component of force normal to the sprung chassis (402) is transferred to the central pivot of the end axles (404) by the links (405) that connect the corners of the chassis (4) to the pivot of the triangles (414) of the unsprung subchassis (401). Only the end axles receive this type of force. FIG. 12 shows the forces normal to the surface being transmitted by the corner links (405).

The force in the longitudinal direction is transferred from the sprung chassis (402) to the central shaft (403) through an opposing double triangle type mechanism, where a triangular base is attached to the sprung chassis (402) and the other base is attached to the central shaft. The two triangles (414) are joined by a nearly spherical ball joint at the apex opposite the bases. From the central shaft (403), this force is shared with the end axles (404) through the unsprung subchassis (401).

The parallel force applied to the sprung chassis (402) is transferred to the central shaft (403) through a double lower transverse quadrilateral (406), articulated by its parallel bases. From the central shaft (403), this force is shared with the end axles (404) through the unsprung subchassis (401).

The rolling force applied to the sprung chassis (402) is transferred to the central shaft (403) through a double rigid quadrilateral, articulated by its parallel bases, the same responsible for the transverse forces. The rolling force of the sprung chassis (402) is integrally applied to the central shaft (403).

In the force of the pitch moment of the chassis, the pitch moment component applied to the sprung chassis (402) is transferred to the central pivot (413) of the end axles (404) by the links (405) that connect the corners of the chassis (4) to the pivot (410) of the triangles (414) of the subchassis (401). Only the end axles receive this force.

In the force of the yaw moment of the chassis, the pitch moment component applied to the sprung chassis (402) is transferred to the central pivot (413) of the end axles by the links that connect the corners of the chassis to the pivot of the triangles (414) of the subchassis (401). From this pivot, the forces are divided between the end axles and the central shaft through the unsprung subchassis (401).

The moment applied to the end axles (404) by its wheels (102) is transferred to the unsprung subchassis (401) by a set of offset double bushings (or corner links) (405). The opposing moments in each subchassis (401) generate opposite reaction forces in the pivots of the unsprung subchassis (401) and in the pivots (413) coinciding with the central shaft (403), which generates a homogeneous distribution of forces in all wheels (102).

The moment applied to the central shaft (403) by its wheels (102) is transferred to the sprung chassis (402) by means of a double opposing triangle type mechanism, in which a triangular base is attached to the sprung chassis (402) and the other base fixed to the central shaft (403). The two triangles (414) are joined by a nearly spherical ball joint at the apex opposite the bases.

The axial force generated by the mecanum wheels (102) is canceled within the axles/shafts themselves (central shaft (403) and end axles (404)), since the wheels (102) always associated with a given axle have the roller helices (103) opposite (left and right).

The invention claimed is:

1. A robot with a magnetic shoe applied to metallic surfaces, wherein the robot comprises: a powertrain, a magnetic shoe, an omnidirectional wheel, a chassis, a robotic manipulator, an electrical panel, a suspension, and a process effector, wherein the chassis has a central shaft connected to two triangles by their bases and at the opposite vertex of these triangles are pivots orthogonal to the central shaft, which are connected to end axles, which are parallel to the central shaft.

2. The robot of claim 1, wherein the robot is equipped with three powertrains comprising a motor, brake, reducer and drive shaft.

3. The robot of claim 2, wherein each powertrain has an omnidirectional wheel.

4. The robot of claim 3, wherein each omnidirectional wheel has nine equally spaced mecanum rollers and two magnetic shoes.

5. The robot of claim 4, wherein each shoe is positioned next to a side face of the wheel.

6. The robot of claim 4, wherein each shoe comprises a permanent magnet in the shape of a horseshoe.

7. The robot of claim 1, wherein the chassis is subdivided into a sprung chassis and an unsprung subchassis articulated that adapts to the surface.

8. The robot of claim 7, wherein the suspension comprises a set of tubular elements connected by rotating joints, connecting axles to the sprung chassis.

9. The robot of claim 8, wherein the suspension is articulated for distribution of traction forces for a system of six mecanum wheels adaptable to any surface in a rigid way.

10. The robot of claim 7, wherein the sprung chassis supports the robot load and the manipulator arm.

11. The robot of claim 1, wherein a gauge of the central shaft is greater than a gauge of the end axles.

12. The robot of claim 1, wherein a subchassis has a central articulation that allows a different height of the end axles in relation to the center shaft.

13. The robot of claim 1, wherein the chassis has pivots at tips of the triangles, where the end axles pivot on a longitudinal axis, allowing the axles to work in a non-parallel manner.

14. The robot of claim 7, wherein a force component normal to the sprung chassis is transferred to a central pivot of the end axles by links that connect corners of the chassis to a pivot of triangles of the unsprung subchassis.

15. The robot of claim 7, wherein force in the longitudinal direction is transferred from the sprung chassis to the central shaft through a double opposite triangle type mechanism, where a triangular base is fixed to the sprung chassis and an other base is fixed to the central shaft, the two triangles being joined by a ball joint at the apex opposite the bases.

16. The robot of claim 15, wherein, on the central shaft, force is divided between the end axles through the unsprung subchassis.

17. The robot of claim 15, wherein parallel force applied to the sprung chassis is transferred to the central shaft through a double rigid quadrilateral, articulated by its parallel bases.

18. The robot of claim 15, wherein rolling force applied to the sprung chassis is transferred to the central shaft through a double rigid quadrilateral, articulated by its parallel bases.

19. The robot of claim 7, wherein a pitch moment component applied to the sprung chassis is transferred to a central pivot of the end axles by links that connect the corners of the chassis to a pivot of triangles of the unsprung subchassis.

20. The robot of claim 19, wherein a moment applied to the end axles by wheels is transferred to the unsprung subchassis by a set of corner links.

21. The robot of claim 19, wherein a moment applied to the central shaft, by wheels, is transferred to the sprung chassis by a double opposing triangle type mechanism, where a triangular base is fixed to the sprung chassis and an other base fixed to the central shaft, the two triangles are joined by a nearly spherical ball joint at the apex opposite the bases.

22. The robot of claim 19, wherein axial force generated by wheels is canceled within the central shaft and end axles.

23. The robot of claim 1, wherein the chassis comprises aluminum structural tubes.

24. The robot of claim 23, wherein the process effector is configured to apply a coating.

25. The robot of claim 1, wherein the electrical panel is mounted on an upper part of the chassis, on the opposite side to which the manipulator is mounted, in order to balance the center of gravity of the set.

26. The robot of claim 25, wherein an umbilical bundle containing electrical and pneumatic power and communication connections reaches an inside of the electrical panel via cable glands.

27. The robot of claim 26, wherein the umbilical bundle contains electrical power and communication for a vehicle panel, the power and command cables of the manipulator, and a supply of compressed air for actuating a coating tool, coupled to the process effector.

28. The robot of claim 25, wherein a static DC-DC converter lowers input supply voltage, internally distributing DC voltages that supply other electrical devices.

\* \* \* \* \*